United States Patent [19]
Qian et al.

[11] Patent Number: 6,070,167
[45] Date of Patent: May 30, 2000

[54] HIERARCHICAL METHOD AND SYSTEM FOR OBJECT-BASED AUDIOVISUAL DESCRIPTIVE TAGGING OF IMAGES FOR INFORMATION RETRIEVAL, EDITING, AND MANIPULATION

[75] Inventors: Richard J. Qian, Vancouver; M. Ibrahim Sezan, Camas, both of Wash.

[73] Assignee: Sharp Laboratories of America, Inc., Camas, Wash.

[21] Appl. No.: 09/033,568

[22] Filed: Mar. 2, 1998

Related U.S. Application Data

[60] Provisional application No. 60/061,405, Sep. 29, 1997.

[51] Int. Cl.[7] .................................................... G06F 17/30
[52] U.S. Cl. ............................................................. 707/102
[58] Field of Search ............................................. 707/102

[56] References Cited

U.S. PATENT DOCUMENTS

| | | | |
|---|---|---|---|
| 5,594,504 | 1/1997 | Ebrahimi | 348/416 |
| 5,611,036 | 3/1997 | Berend et al. | 345/441 |
| 5,832,495 | 11/1998 | Gustman | 707/102 |
| 5,862,260 | 1/1999 | Rhoads | 382/232 |
| 5,946,419 | 8/1999 | Chen et al. | 382/243 |

FOREIGN PATENT DOCUMENTS

WO 97/12342   4/1997   WIPO .

OTHER PUBLICATIONS

Murray et al., *Graphics File Formats, 2d Edition,* 1996 pp. 510–515.

Murray, et al., *Graphics File Formats, 2d Edition,* 1996 pp. 822–837.

*Core Experiments on MPEG–4 Video Shape Coding,* ISO/IEC JTC1/SC29/WG11 N1584, Mar. 1997.

*MPEG–7: Context and Objectives* (V.4—Stockholm), ISO/IEC JTC1/SC29/WG11 N1733 MPEG97, Jul. 1997.

*Digital Compression and Coding of Continuous–Tone Still Images—Extensions* Annex F of ITU–T Recommendation T.84: ISO/IEC IS 10918–3, Jul. 1997.

*Primary Examiner*—Wayne Amsbury
*Attorney, Agent, or Firm*—Robert D. Varitz, PC

[57] ABSTRACT

A hierarchical system for object-based audiovisual descriptive tagging of images for information retrieval, editing, and manipulation, includes: an object-based selection mechanism for selecting an object of interest in said image; hierarchical data structure generation means for generating a hierarchical data structure for said image and for associating auxiliary information with said image; and a transmission/storage mechanism for storing the image and the hierarchical data structure. A hierarchical method for object-based audiovisual descriptive tagging of images for information retrieval, editing, and manipulation, includes: selecting an object of interest in said image with an object-based selection mechanism; generating a hierarchical data structure for said image and for associating auxiliary information with said image; and transmitting/storing the image and the hierarchical data structure.

28 Claims, 3 Drawing Sheets

HIERARCHICAL METHOD AND SYSTEM FOR OBJECT-BASED AUDIOVISUAL DESCRIPTIVE TAGGING OF IMAGES FOR INFORMATION RETRIEVAL, EDITING, AND MANIPULATION

This application claims benefit of Provisional Application 60/061,405 Sep. 29, 1997.

FIELD OF THE INVENTION

This invention relates to systems that associate information with images and utilize such information in content-based information retrieval, object-based editing and manipulation applications, and a method of manipulating information in such systems.

BACKGROUND OF THE INVENTION

Associating information with images is useful to enable successful identification of images and the interchange of images among different applications. When associated information is audiovisually rendered in addition to the image data itself, images may be utilized and enjoyed in new ways. In known methods and systems, such information is generally global in nature, i.e., it applies to the entire image without distinguishing between different objects (e.g., person versus background, or different persons) in the image. An example of a file format that has been developed by standardization bodies, that allow global information attachment to images, is Still Picture Interchange File Format (SPIFF), specified as an extension to the JPEG standard, ISO/IEC IS 10918-3 (Annex F).

In known systems, information is simply "pushed" to the user with no provisions for interactivity. Known systems do not address audio-visualization of content information at all; they are geared towards classical image database or image file exchange applications. There is no way for the user to learn additional information about the subject of the image as displayed.

SUMMARY OF THE INVENTION

The hierarchical system for object-based audiovisual descriptive tagging of images for information retrieval, editing, and manipulation, of the invention includes: an object-based selection mechanism for selecting an object of interest in an image; a hierarchical data structure generation means for generating a hierarchical data structure for the image and for associating auxiliary information with the image; and a transmission/storage mechanism for storing the image and the hierarchical data structure.

The hierarchical method of the invention for object-based audiovisual descriptive tagging of images for information retrieval, editing, and manipulation, includes: selecting an object of interest in an image with an object-based selection mechanism; generating a hierarchical data structure for the image and for associating auxiliary information with the image; and transmitting/storing the image and the hierarchical data structure.

It is an object of the invention to develop a hierarchical data structure and method that enables association of descriptive data to an image.

Another object of the invention is to provide a system and method where the descriptive data may be specific to objects in the image and may include textual information, links to other files, other objects within the same image or other images, or links to web pages, and object features, such as shape, and audio annotation.

A further object of the invention is to provide a system and method that provides a means for creation of image content-related information, forming the data structure containing this information, and means for experiencing this information. Such systems may include a camera, or a camera connected to a personal computer, or any information appliance with image acquisition or generation, viewing, and handling capabilities. In the above, the term "experiencing" refers to audio-visually observing image-content related information by display and playback, and utilizing refers to editing, archiving and retrieving, manipulating, re-purposing and communication of images.

DETAILED DESCRIPTION OF THE PREFERRED EMBODIMENTS

This invention provides a system and method for (i) defining object-based information about regions within a digital image, (ii) structuring and integrating such information to a common file format that contains the image data itself, and (iii) utilizing such information in content-based information retrieval, object-based editing and manipulation applications.

The method of the invention is designed to work with any image compression standard, such as the current JPEG standard, as well as future versions of JPEG, such as JPEG2000. Associating information about bounding rectangles of different image objects, as well as precise contour data are among the unique features of this invention. An important feature of the invention is that the hierarchical data structure and the content-related information is downloaded and presented to a user only at the user's request. An object-based paradigm is provided. The system and method supports new types of content-related information such as Web pages and object boundary information. A linking mechanism which may link an image or a region/object in an image to any other local or remote multimedia content is provided. The newly defined format is backwards compatible with existing systems.

The invention uses an object-based paradigm as opposed to the frame-based, i.e., information refers to the entire image without enabling the possibility for distinguishing among different image objects, paradigms of known systems.

Figure 1:
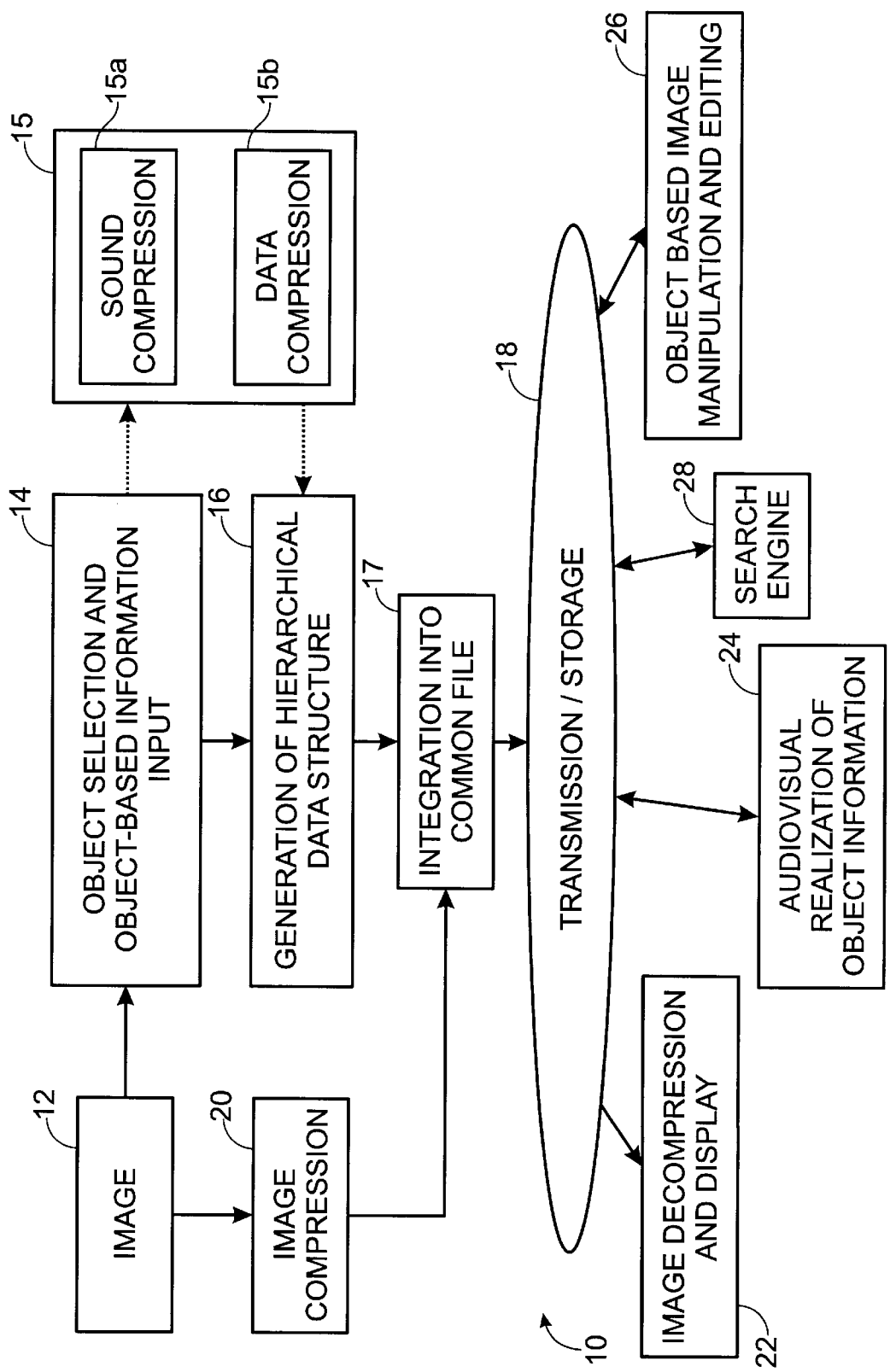
FIG. 1 is a block diagram of the major components of the system of the invention.

The major components of an embodiment of a system of the invention are depicted in FIG. 1, generally at 10. In this embodiment, an image 12 is acquired and/or generated. The image may be acquired by a camera, generated by a computer, or may be an existing image. Once the image is acquired, object selection 14 may be performed interactively by drawing rectangles that enclose objects of interest. Rectangles may be drawn on an LCD via pen stylus input, in the case where image 12 acquisition or generation occurs in a camera or on a computer, respectively. Alternatively, object selection may be performed on a computer platform to which digital images are downloaded. Object-based information input 14 may be performed via pen input for textual and link information. Audio annotation may be input via a microphone that may be integrated to the camera to allow annotation during the acquisition process. It is also possible to feature a speech recognition module in the camera and input textual information via speech using speech-to-text conversion. A compression module 15 includes an audio compression mechanism 15a and a data compression mechanism 15b. Compression of audio annotation using a standard audio compression method (e.g., Delta Pulse Coded Modulation (DPCM)) and compression of other associated data using a standard data compression method (e.g., Lempel-Zev-Welch (LZW)) are optional.

Generation of a hierarchical data structure 16 containing the information in two levels, where the first layer is called the "base layer", is described later herein. An integration module 17 combines content related data and the image data itself into a common file in the preferred embodiment. This combination may be supported as a native part of a future image file format, such as, for example, that which may be adopted by JPEG2000 or MPEG4. It is also possible, however, to use currently existing standard file formats by extending them in a proprietary fashion. The latter will provide backward compatibility in the sense that a legacy viewer using an existing file format may at least display the image, without breaking down, and ignore the additional information. This will be described later herein. An implementation with separate image and information files is also possible, with certain pros and cons, as will be described later in connection with FIG. 4. Integrated image-content and image data itself is then transmitted or stored, block 18, in a channel, in a server, or over a network.

Storage may be a memory unit, e.g., memory in an electronic camera, or in a server. Alternatively, the integrated data may be sent via Email, or as an attachment to an Email. Image compression module 20 is optional and may be provided to implement the JPEG standard, or any other image compression algorithm. If audio and/or the other associated data is compressed, decompression of audio and/or data is performed prior to audiovisual realization of the information in module 24. Once images and the hierarchical data structure associated with them are available to users, they may be utilized interactively.

Interactive Audiovisual Realization:

An interactive system utilizing the invention may follow the following steps to implement the retrieval and audiovisual realization of object information, block 24, associated with the image:

(a) retrieve and display the image data;
 (b) read the base layer information;
 (c) using the base layer information as an overlay generation mechanism, generate an overlay to visually indicate the regions that contain information in terms of "hot spots", according to the region information contained in the base layer. A hot spot may be only highlighted when user's pointing device points at a location within the area of that region;
 (d) display pop-up menus by the objects as the user points and clicks on the hot spots, where the types of available information for that object are featured in the menus; and
 (e) render the information selected by the user when the user clicks on the appropriate entry in the menu.

It is important to note that the hot spots and pop-ups are only invoked in response to user's request. In that sense, the additional information provided by this invention never becomes intrusive. Steps a–e are implemented by audiovisual realization of object information module 24, which contains appropriate computer software.

In a complete implementation of the invention, content-based image retrieval and editing are also supported. A search engine 28 is provided to allow the user to locate a specific image. Editing is provided by an object-based image manipulation and editing subsystem 26. Images 12 may be contained in a database which contains a collection of digital images therein. Such an image database may also be referred to as a library, or a digital library.

Content-based information retrieval provides users new dimensions to utilize and interact with images. First, the user may click on some regions/objects of interest in an image to retrieve further information about them. Such information may include: links to the related Web sites or other multimedia material, textual descriptions, voice annotation, etc. Second, the user may look for certain images in a database via advanced search engines. In database applications, images may be indexed and retrieved on the basis of associated information describing their content. Such content-based information may be associated with images and objects within images and subsequently used in information retrieval using the current invention.

Object-based image editing enables a user to manipulate images in terms of the objects in the images. For example, the user may "drag" a human subject in a picture, "drop" it to a different background image, and therefore compose a new image with certain desired effects. The current invention allows access to precise outline (contour) information of objects to enable cutting and dragging objects from one image to another where they may be seamlessly integrated to different backgrounds. Together, content-based information retrieval and object-based image editing offer a user new exciting experience in viewing and manipulating images.

In the following, an integrated method to enable an image data structure to support content-based information retrieval and object-based image editing is disclosed. The method constructs a hierarchical data structure in which the "base layer" carries only content-related information indicators and is extremely light weight. The actual content-related information is carried in the "second layer." The hierarchical implementation ensures that the downloading efficiency of compressed images is practically intact after introducing the new functionalities, while those functionalities may be fully realized when a user instructs so.

There are two major objectives when developing a method to support content-based information retrieval and object-based image editing. They are: 1) a compressed image which supports such functionalities should be able to be downloaded at essentially the same speed and stored using essentially the same disk space as if it does not support such functionalities; 2) such functionalities may be fully realized when a user/application elects to do so.

To fulfill the above objectives, a hierarchical data structure which has two layers is used. The first layer, referred to herein as the "base layer," contains up to a fixed number of bytes. Those bytes are used for specifying a number of regions of interest and storing a number of flags which indicate whether certain additional content-related information is available for a region. The second layer carries the actual content-related information. In a networking application, initially only the compressed image and the base layer of its associated content-related information are transmitted. Since the base layer carries only up to a fixed small number of bytes, its impact on transmitting speed of the image may be negligible in practice.

Figure 2:
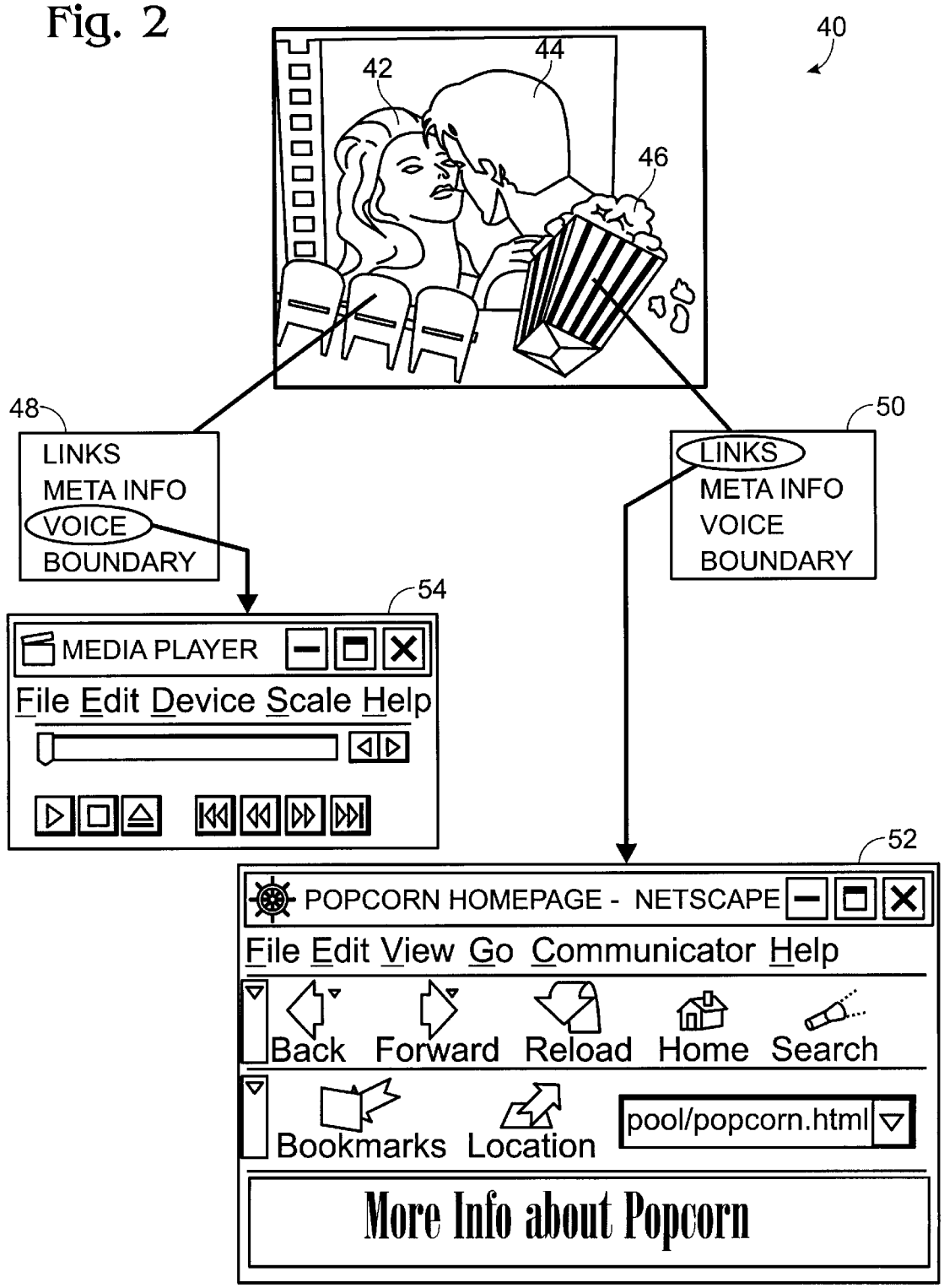
FIG. 2 is a block diagram of a content-based information retrieval system.

Referring now to FIG. 2, after the initial downloading, a user may view the image 40, and may also decide to interact with the contents of the image. This may include interacting with an object of interest, such as character 1 (42), character 2 (44) or another item, such as item 46. Alternately, a region of the image may be considered as an object of interest. The entire image also may be treated as an object of interest. The user may do so by "clicking" on regions or objects in which the user may be interested. The system will then display a pop-up menu 48, 50, which lists the available information related to the chosen region or object, based on the flags stored in the base layer. If the user selects one item in the menu, the system will then start downloading the related information stored in the second layer from the original source and display it to the user. The user may also choose to save a compressed image with or without its content-related information. When the user chooses to save the image with its content-related information, the flags corresponding to the available information in the base layer will be set to true, and vice versa.

An initial set of content-related information, which may be of common interest, includes: 1) links; 2) meta textual information; 3) voice annotation; and 4) object boundary. Additionally, 5) security-copyright information; and 6) references to MPEG-7 descriptors, as described in "*MPEG-7: Context and Objectives* (*Version 4*)," ISO/IEC JTC1SC29/WG11, Coding of Moving Pictures and Audio, N1733, July 1997, may be displayed (not shown). The syntax of Table 1 may be used to support the acquisition of content-related information. It should be noted that other types of content-related information may be added to this initial set as necessary in order to satisfy various applications. For example, a computer code, for instance written in Java® language, may be added to the list of associated information. In some cases, the system will open an already running application, such as a web browser, media player, or, the system may be required to launch an application if the application is not already running. Such applications may take any form, such as a word processing application, a Java® Applet, or any other required application.

TABLE 1

BASE LAYER SYNTAX

| Syntax | Bits | Mnemonic |
|---|---|---|
| num_of_regions | 6 | uimsbf |
| for (n = 0; n < num_of_regions; n++) { | | |
| region_start_x | N | uimsbf |
| region_start_y | N | uimsbf |
| region_width | N | uimsbf |
| region_height | N | uimsbf |
| link_flag | 1 | bslbf |
| xneta_flag | 1 | bslbf |
| voice_flag | 1 | bslbf |
| boundary_flag | 1 | bslbf |
| security_flag | 1 | bslbf |
| mpeg7_flag | 1 | bslbf | where N = ceil(log$_2$ (max(image_width, image_height))).

Semantics num_of_regions the number of regions in an image which may have additional content-related information.
region_start_x the x coordinate of the upper-left corner of a region.
region_start_x the y coordinate of the upper-left corner of a region.
region_width the width of a region.
region_height the height of a region.
link_flag a 1-bit flag which indicates the existence of links for a region. '1' indicates there are links attached to this region and '0' indicates none.
meta_flag a 1-bit flag which indicates the existence of meta information for a region. '1' indicates there is meta information and '0' indicates none.
voice_flag a 1-bit flag which indicates the existence of voice annotation for a region. '1' indicates there is voice annotation and '0' indicates none.
boundary_flag a 1-bit flag which indicates the existence of accurate boundary information for a region. '1' indicates there is boundary information and '0' indicates none.
security_flag a 1-bit flag which indicates the existence of security-copyright information for a region. '1' indicates there is such information and '0' indicates none.
mpeg7_flag a 1-bit flag which indicates the existence of references to MPEG-7 descriptors for a region. '1' indicates there is MPEG-7 reference information and '0' indicates none.

The above syntax suggests that the base layer is light weight. With 256 bytes, for example, the base layer may define at least 26 regions anywhere in an image whose size may be as large as 65,536×65,536 pixels. To define 4 regions in an image, the base layer consumes only 38 bytes.

SECOND LAYER SYNTAX

The second layer carries actual content-related information which, for each region, may include links, meta information, voice annotation, boundary information, security-copyright information, and MPEG-7 reference information. The high-level syntax of Table 2 may be used to store the above information in the second layer.

TABLE 2

| Syntax | Bits | Mnemonic |
|---|---|---|
| for (n = 0; n < num_of_regions; n++) { | | |
| links () | | |
| meta () | | |
| voice () | | |
| boundary () | | |
| security() | | |
| mpeg7 () | | |
| end_of_region | 16 | bslbf |
| } | | |

The links and meta information are textual data and requires lossless coding. The voice information may be coded using one of the existing sound compression format, such as delta pulse coded modulation (DPCM). The boundary information may utilize the shape coding techniques developed in MPEG-4 "Description of *Core Experiments on Shape Coding in MPEG-4 Video*," ISO/IEC JTC1/SC29/WG11, Coding of Moving Pictures and Audio, N1584, March 1997. The security-copyright information may utilize certain encryption techniques. The earlier cited MPEG-7 reference information contains certain types of links to the future description streams developed in MPEG-7.

The exact syntax and format for each type of the above-identified content-related information may be determined during the course of file format development for future standards, and are presented herein merely as exemplars of the system and method of the invention. In general, however, the syntax structure of Table 3 may be used.

TABLE 3

| Syntax | Bits | Mnemonic |
| --- | --- | --- |
| type_of_info | 8 | bslbf |
| length_of_data | 16 | uimsbf |
| data () | | |

Semantics links() the sub-syntax for coding links.
meta() the sub-syntax for coding meta information.
voice() the sub-syntax for coding voice annotation.
boundary() the sub-syntax for coding boundary information.
security() the sub-syntax for coding security-copyright information.
mpeg7() the sub-syntax for coding MPEG-7 reference information.
end_of_region a 16-bit tag to signal the end of content-related information for a region.
type_of_info a 8-bit tag to uniquely define the type of content-related information. The value of this parameter may be one of a set of numbers defined in a table which lists all types of content-related information such as links, meta information, voice annotation, boundary information, security-copyright information, and MPEG-7 reference information.
length_of_data the number of bytes used for storing the content-related information.
data () the actual syntax to code the content-related information. This may be determined on the basis of application requirements, or in accordance to the specifications of a future file format that may support the hierarchical data structure as one of its native features.

A few examples which demonstrate some typical use of the functionalities are now presented.

Content-Based Information Retrieval

Attaching additional information, such as voice annotation and URL links to regions/objects in an image allows a user to interact with the image in a more interesting way. It adds a new dimension to the way we view and utilize still images. FIG. 2 depicts a scenario where an image with such functionalities, i.e., an information enhanced image, is displayed. The application reads the image data as well as the base layer information. It then displays the image and visually indicates the "hot spots" via an overlay on the image, according to the region information in the base layer. A user clicks on a region/object which the user may be interested in. A pop-up a menu appears which lists items that are available for the selected region/object. When the user selects the voice annotation item, for example, the application will then locate the sound information in the second layer and play it back using a default sound player application. If the user selects a link which is a URL link to a Web site 52, the system will then locate the address and display the corresponding Web page in a default Web browser. A link may also point to another image file or even point to another region/object in an image. Similarly, additional meta information may also be retrieved and viewed (in a variety of different forms) by the user by simply selecting the corresponding item from the menu, such as a media player 54.

Using the method described above, different regions/objects in the same image may have different additional information attached. A user is able to hear different voices corresponding to different characters in the image, for instance. Individual Web pages may also be attached directly to more relevant components in the scene, respectively.

Object-Based Image Editing

Figure 3:
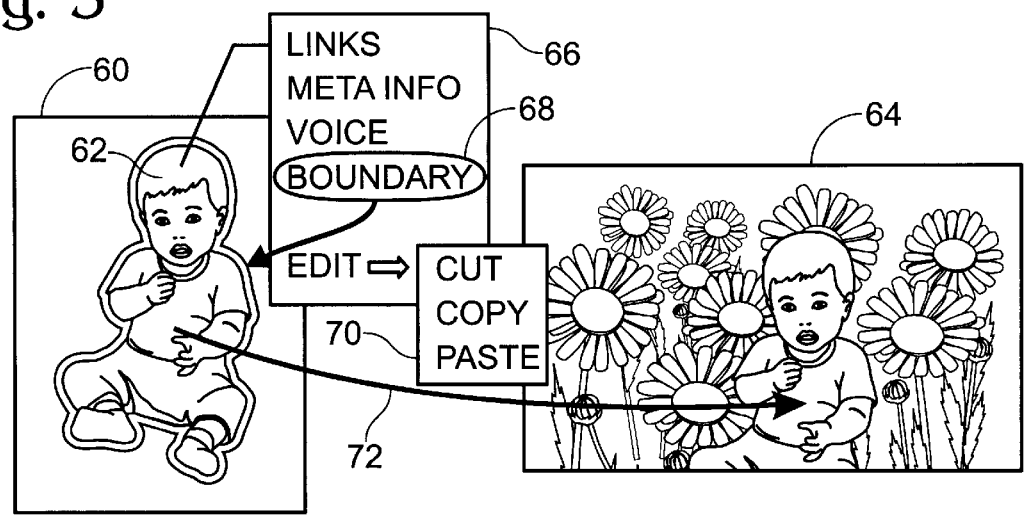
FIG. 3 is a block diagram depicting an object-based image editing method.

When images are edited, it is desirable to cut/copy/paste in terms of objects having arbitrary shapes. The proposed method supports such functionality provided additional shape information is coded. FIG. 3 depicts an example whereby using the boundary information 60 associated with a baby object 62, a user may copy baby object 62, and place it into a different background 64, thus, moving one computer-generated image into another computer-generated image. The sequence of actions may happen in the following order. The user first clicks on baby object 62 and the system pops up a menu 66. The user then selects the boundary item 68, which is generated by a boundary generation mechanism in the system. The system then loads the boundary information and highlights the baby object, as is indicated by the bright line about the object. The user may then copy and paste 70 the baby object by either performing drag and drop type 72 of action, or by selecting the copy and paste functions from the edit menu 70.

Content-Based Retrieval of Images

By associating MPEG-7 descriptors to images, the images may be retrieved based on their graphical contents by advanced search engines. The descriptors may include color, texture, shape, as well as keywords, as to be determined in MPEG-7. In general, an image only needs to carry light-weight reference information which points to the MPEG-7 description stream.

An integrated method to support the advanced functionalities of content-based information retrieval and object-based image editing has been disclosed. The method employs a two-layer hierarchical data structure to store the content-related information. The first layer carries coordinates which specify regions of interest in rectangular shape and flags which indicate whether certain additional content-related information is available for the specified regions. The actual content-related information is stored in the second layer where one may find links, meta information, voice annotation, boundary information, security-copyright information, and MPEG-7 reference information for each specified region.

The first layer is designed to be light weight, i.e., at most 256 bytes. This ensures that the downloading and storage efficiency of a compressed image may be essentially intact unless a user explicitly requires additional content-related information. On the other hand, should the user require such information, our proposed method also guarantees it may be fully delivered.

The existing JPEG compressed image file formats, such as still picture interchange file format (SPIFF) or JPEG File Interchange Format (JFIF), do not inherently support object-based information embedding and interactive retrieval of such information. Although, creation and experiencing and utilization of information enhanced images may be performed using the method and system of the current invention, it may be desirable that the information enhanced images created by the current invention may be at least decoded and displayed by legacy viewers using JFIF or SPIFF. Indeed the legacy systems will not be able to recognize and utilize the associated information as the invention system would. The goal is therefore to guarantee successful image decoding and display by a legacy system without breaking down the legacy system.

If backward compatibility with legacy viewers, such as those that utilize JFIF and SPIFF file formats, is a necessity, the disclosed hierarchical data structure may be encapsulated into a JIFF or SPIFF file format. Examples of such encapsulations that may be implemented by module 17 in FIG. 1 are given below.

Figure 5:
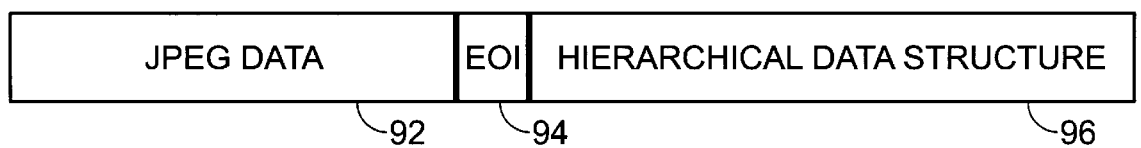
FIG. 5 depicts integration of the hierarchical data structure with image data using JFIF file format.

In case of JIFF file format (Graphics File Formats: Second Edition, by J. D. Murray and W. VanRyper, O'Reilly & Associates Inc., 1996, pp. 510–515.) Referring now to FIG. 5, a JFIF file structure is shown generally at 90. The JFIF file format contains JPEG data 92 and an End Of Image (EOI) marker 94. A JFIF viewer simply ignores any data that follows the EOI marker. Hence, if the 2-layer hierarchical data structure 96 disclosed herein is appended to a JFIF file immediately after EOI 94, the legacy viewers will be able to decode and display the image, ignoring the additional data structure. A system constructed according to the current invention may appropriately interpret the additional data and implement the interactive functionalities of the invention.

Using SPIFF, the hierarchical data structure may be encapsulated using a private tag, known to the system of the current invention. Since a legacy viewer will ignore non-standard tags and associated information fields, according to the SPIFF specification, images may be successfully decoded and displayed by SPIFF-compliant legacy systems. The system of the invention will then recognize and appropriately utilize the added data to enable its interactive functionalities. (Another more accessible reference for SPIFF is: Graphics File Formats: Second Edition, by J. D. Murray and W. VanRyper, O'Reilly & Associates Inc., 1996, pp.822–837.) REF The method may be applied to any existing computing environment. If an image file is stored in a local disk, the proposed functionalities may be realized by a stand-alone image viewer or any application which supports such functionalities, without any additional system changes. If the image file is stored remotely on a server, the proposed functionalities may still be realized by any application which support such functionalities on the client side, plus an image parser module on the server. The reason the server needs to include an image parser is because the additional content-related information resides in the same file as the image itself. When a user requests certain content-related information regarding a selected region/object in an image, e.g., its meta information, it is important that the system will fetch only that piece of information and present it to the user as fast as possible. To achieve this objective, the server has to be able to parse an image file, locate and transmit any piece of content-related information specified by the client.

Figure 4:
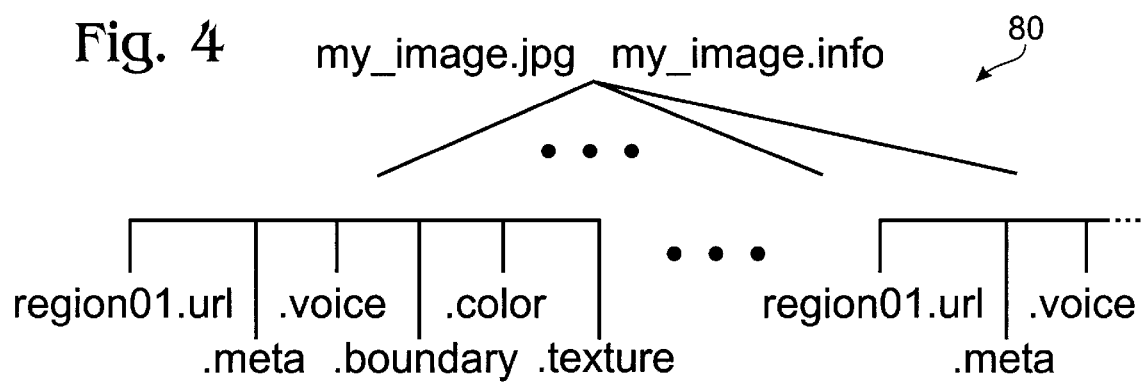
FIG. 4 depicts the file structure of the preferred embodiment.

To implement the above without any enhancement on a currently existing network server, each content-related information has to be stored in a separate file, as shown in FIG. 4, generally at 80. Therefore, for each defined region, as many as six files which contain links, meta information, voice annotation, boundary information, security-copyright information, and MPEG-7 reference information, respectively. For a given image, say my_image.jpg, a directory called my_image.info which contains content-related information for N defined regions is created and stored in:

region01.links
region01.meta
region01.voice
region01.boundary
region01.security
region01.mpeg7
*****
regionON.links
regionON.meta regionON.voice
regionON.boundary
regionON.security
regionON.mpeg7

Of course, the solution of using separate files to store addition information is fragile and messy in practice. A simple mis-match between the file names due to name change would cause the complete loss of the content-related information.

"Images" in this invention may correspond to frames of digital video sequences, for example to a set of frames that are most representative of the video content. It should also be noted that the image-content information may be compressed to provide storage efficiency and download speed. This may be performed by state of the art compression methods. Shape information may be compressed, for instance, using the method included in the MPEG4 standard. In this case, the viewing application should be equipped with the appropriate decompression tools.

The invention has the following advantages over the known prior art: (1) it is object-based and thus flexible; (2) it allows for inclusion of object feature information, such as object shape boundary; (3) is has a hierarchical data structure and hence it does not burden in any way those applications that choose not to download and store image-content related information; (4) it allows audiovisual realization of object-based information, at users' request; (5) it allows for inclusion of URL links and hence provides an added dimensionality to enjoyment and utilization digital images (The URL links may point to web pages related to the image content, such as personal web pages, product web pages, and web pages for certain cities, locations etc.); and (6) it is generic and applicable to any image compression technique as well as to uncompressed images. With the same token, it may provide object-based functionalities to any forthcoming compression standards, such as JPEG 2000. Although, none of the current file formats inherently support the method and the system disclosed herein, methods of implementing the system in a backward compatible manner where legacy systems may at least decode the image data and ignore the added information have been disclosed.

Data structures configured in the manner described in the invention may be downloaded over a network in a selective fashion not to burden applications that are only interested in the image data but not the content information. The downloading application checks with the user interactively whether the user desires to download and store the content information. If the user says "No", the application retrieves only the image data and the base layer and sets the flags in the base layer to zero indicating that there are no content information with the image.

The method and system also support scalable image compression/decompression algorithms. In quality-scalable compression, image may be decoded at various different quality levels. In spatial scalable compression, the image may be decoded at different spatial resolutions. In case of compression algorithms that support scalability, only the region information and object contour needs to be scaled to support spatial scalability. All other types of data stay intact.

Although a preferred embodiment of the system and method of the invention have been disclosed, it will be appreciated by those of skill in the art that further variations and modifications may be made thereto without departing from the scope of the invention as defined in the appended claims.

We claim:

1. A hierarchical system for associating object-based information with images for information retrieval, editing, and manipulation, comprising:
   an object-based selection mechanism for selecting an object of interest in an image;
   hierarchical data structure generation means for generating a hierarchical data structure for said image and for associating object-based information with said image;
   a transmission/storage mechanism for storing the image and the hierarchical data structure;
   a retrieval and manipulation mechanism for allowing a user selectively to retrieve and manipulate the image and the object-based information associated therewith; and
   a generation mechanism for generating an overlay associated with said image, wherein said overlay includes at least one hot spot which is visually distinguishable from the remainder of the image when highlighted by the user.

2. The system of claim 1 which includes an image acquisition mechanism for acquiring an image.

3. The system of claim 1 which includes a display mechanism for displaying the image to a user.

4. The system of claim 3 wherein said display mechanism is constructed and arranged to display said hierarchical data structure to a user.

5. The system of claim 1 which includes a storage mechanism for storing an image.

6. The system of claim 1 which includes a database containing a collection of digital images therein.

7. The system of claim 1 wherein said image and said hierarchical data structure for said image are stored in a single file.

8. The system of claim 1 wherein said image and said hierarchical data structure for said image are stored in separate files.

9. The system of claim 1 wherein said generation mechanism generates boundary information for identifying a boundary about an object of interest, and wherein said boundary groups all of the information within said boundary for manipulation by the user.

10. The system of claim 1 which includes an audiovisual realization mechanism wherein object-based information is visually displayed to the user, and audibly played to the user, upon the user's request.

11. The system of claim 1 which includes an audiovisual realization mechanism wherein object-based information is used for object-based image editing.

12. The system of claim 1 wherein said hierarchical data structure includes a base layer which includes only content-related information indicators, and a second layer which includes content-related information.

13. A hierarchical system for associating object-based information with images for information retrieval, editing, and manipulation, comprising:
   an image acquisition mechanism for acquiring an image;
   an object-based selection mechanism for selecting an object of interest in said image;
   hierarchical data structure generation means for generating a hierarchical data structure for said image and for associating object-based information with said image, thereby forming an information-enhanced image;
   a transmission/storage mechanism for storing the information-enhanced image;
   a display mechanism for displaying the information-enhanced image to a user;
   a retrieval and manipulation mechanism for allowing a user selectively to retrieve and manipulate the image and the object-based information associated therewith; and
   a generation mechanism for generating boundary information for identifying a boundary about an object of interest, and wherein said boundary groups all of the information within said boundary for manipulation by the user.

14. The system of claim 13 wherein said display mechanism is constructed and arranged to display said hierarchical data structure of the information-enhanced image to a user.

15. The system of claim 13 which includes a database containing a collection of digital images therein.

16. The system of claim 13 wherein said image and said hierarchical data structure for said image are stored in a single file.

17. The system of claim 13 wherein said image and said hierarchical data structure for said image are stored in separate files.

18. The system of claim 13 wherein said generation mechanism generates an overlay associated with said image, and wherein said overlay includes at least one hot spot which is visually distinguishable from the remainder of the image when highlighted by the user.

19. The system of claim 13 which includes an audiovisual realization mechanism wherein object-based information is visually displayed to the user, and audibly played to the user, upon the user's request.

20. The system of claim 13 which includes an audiovisual realization mechanism wherein object-based information is used for object-based image editing.

21. The system of claim 13 wherein said hierarchical data structure includes a base layer which includes only content-related information indicators, and a second layer which includes content-related information.

22. A hierarchical method for associating object-based information with images for information retrieval, editing, and manipulation, comprising:
   selecting an object of interest in an image with an object-based selection mechanism;
   generating a hierarchical data structure for said image and for associating object-based information with the image, including generating a base layer which includes only content-related information indicators, and generating a second layer which includes content-related information;
   selectively retrieving and manipulating the image and the information associated therewith: including:
      (a) retrieving the image data;
      (b) reading the base layer information;
      (c) displaying the image;
      (d) generating an overlay to visually indicate the regions that contain object-based information in terms of "hot spots", according to the region information contained in the base layer;
      (e) displaying pop-up menus as the user points and clicks on the hot spots, wherein the types of available object-based information are featured in the menus; and
      (f) retrieving and rendering the object-based information selected by the user when the user clicks on the appropriate entry in the menu; and
   transmitting/storing the image and the hierarchical data structure.

23. The method of claim 22 which includes acquiring an image with an image acquisition mechanism.

24. The method of claim 22 which includes displaying the transmitted/stored image to a user.

25. The method of claim 22 which further includes displaying visually object-based information and playing, audibly object-based information to the user, upon the user's request.

26. The method of claim 22 which includes using object-based information for object-based image editing.

27. The method of claim 22 wherein said generating an overlay includes highlighting a hot spot when user's pointing device points at a location within the area of that region.

28. The method of claim 22 wherein said generating an overlay includes identifying a boundary about an object of interest.

* * * * *